Figure 5:
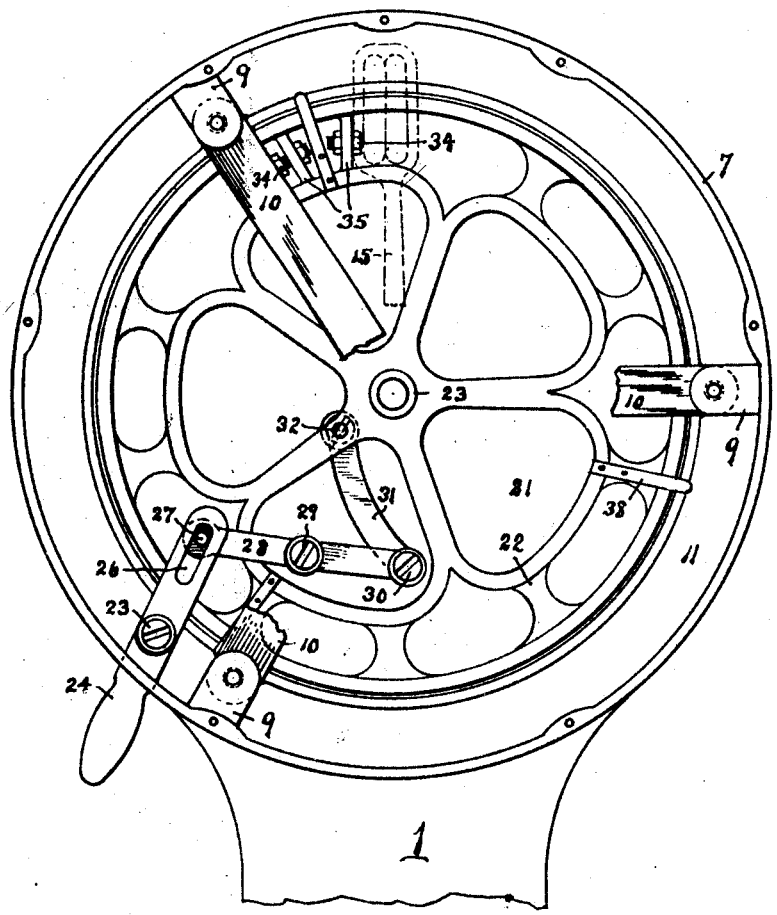

May 17, 1927.
L. JAENICHEN
SCALE
Filed Dec. 21, 1925  2 Sheets-Sheet 1
1,628,781
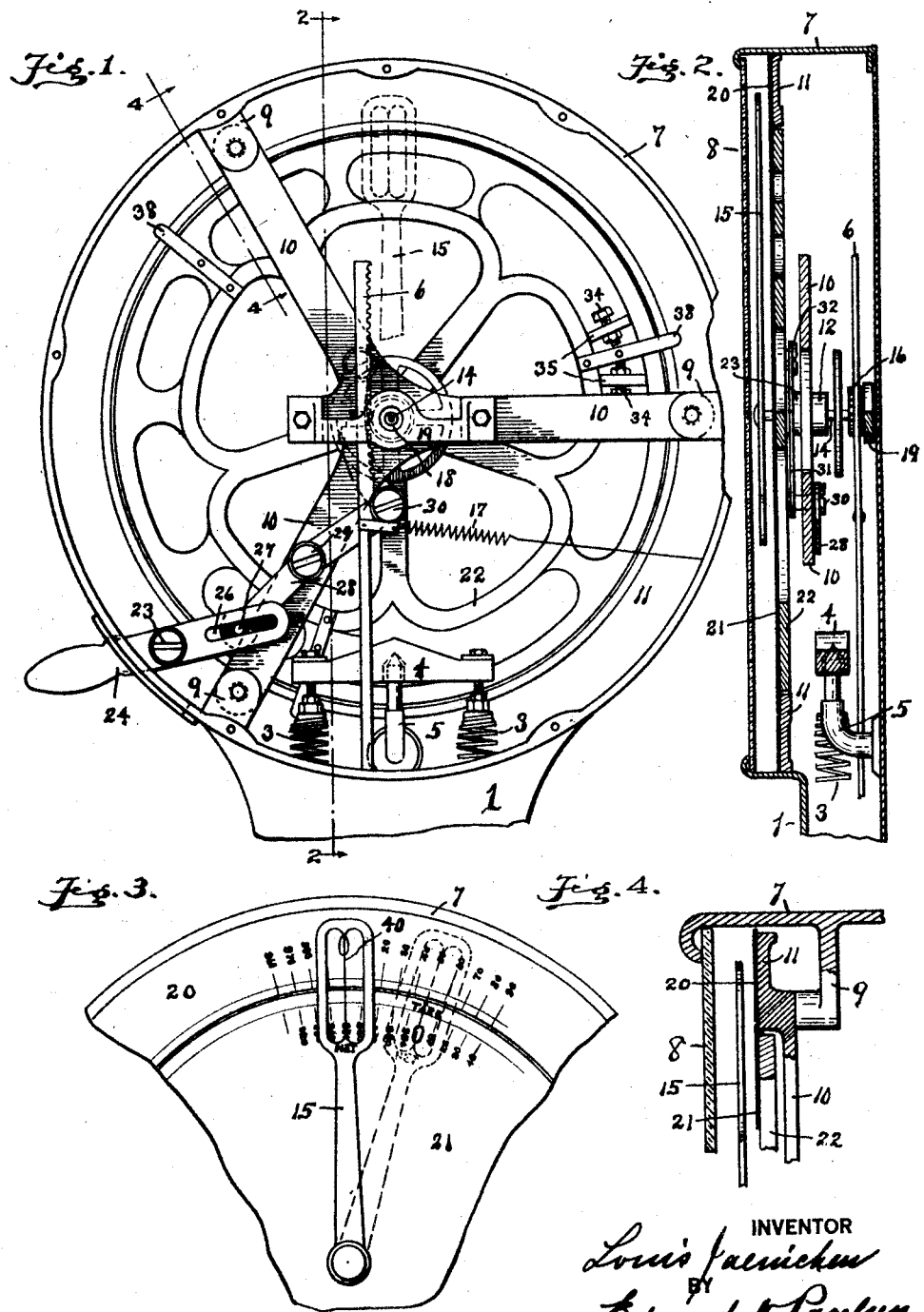
INVENTOR
Louis Jaenichen
BY
Edward N. Paglin
ATTORNEY May 17, 1927.   L. JAENICHEN   1,628,781
SCALE
Filed Dec. 21. 1925   2 Sheets-Sheet 2

INVENTOR
Louis Jaenichen
BY
Edward N. Pagelsen
ATTORNEY

Patented May 17, 1927.

1,628,781

UNITED STATES PATENT OFFICE.

LOUIS JAENICHEN, OF SPRINGFIELD TOWNSHIP, OAKLAND COUNTY, MICHIGAN, ASSIGNOR TO THE STANDARD COMPUTING SCALE COMPANY, OF DETROIT, MICHIGAN, A CORPORATION OF MICHIGAN.

SCALE.

Application filed December 21, 1925. Serial No. 76,666.

This invention relates to that class of scales in which the dial is provided with a circular ring of graduations to indicate weights, and a pointer is rotatably mounted adjacent this dial and is connected in such a manner with the load receiving and load resisting mechanisms that it will so turn that the increments of weight will be indicated by the pointer as it passes over the dial, and its object is to provide a second graduated dial and manually operable means to position it to subtract tare from each load and indicate the remainder or net weight and at the same time indicate the gross weight and the tare.

Wheel-barrows are often employed for moving articles in bulk, and their weights, which are determined before using them, are subtracted from the gross weights. I have provided simple means whereby this tare can be instantly provided for, for each barrow as it is moved onto the scale platform. The tare for any other weighing can be taken care of in a similar manner.

This invention, therefore, consists in a pair of concentric scale dials and a pointer mounted concentric thereto, and novel mechanism whereby one dial may be rotated relative to the other from a position where the zero points of both are in radial alinement to where the zero point of the movable dial is opposite the graduation on the other dial which indicates the tare, the pointer being provided with indicating devices which are effective relative to both dials.

It further consists in the details of construction illustrated in the accompanying drawings and particularly pointed out in the claims.

In the drawings, Fig. 1 is a rear elevation of a scale embodying this invention, with the back of the case removed. Fig. 2 is a vertical section on the line 2—2 of Fig. 1. Fig. 3 is a partial front elevation of the scale face. Fig. 4 is a section on the line 4—4 of Fig. 1. Fig. 5 is an elevation of the mechanism for turning the movable dial.

Similar reference characters refer to like parts throughout the several views.

No lever mechanism is shown as it forms no part of the present invention, but it may be assumed that it is mounted in a base supporting a pedestal whose upper end 1 is shown in Figs. 1 and 5. The load resisting springs 3 are shown connected to a cross bar 4 mounted on a pin 5 supported in any desired manner, and a rack bar 6 is suitably connected to the load lever-system.

A case 7 at the upper end of the pedestal supports the glass front 8 and three short arms 9, on which is mounted a spider comprising the arms 10 connected at their outer ends by a ring 11, and at the center of the spider these arms 10 support a hub 12 which constitutes a bearing for the shaft 14 on which the indicator 15 and the pinion 16 are mounted, the pinion meshing with the rack bar 6 which is held against it by a spring 17. The indicator moves equal distances for equal increments of load on the scale. A bracket 19 carried by the spider supports the rear bearing 18 for the shaft 14.

A stationary dial ring 20 is mounted in the case on the ring 11 and a rotatable dial disc 21 is secured to a spider 22 whose hub 23ª (Fig. 5) is journaled on the hub 12. The ring 11 carries a pivot 23 for the lever 24 whose handle end extends out of the case through a slot and whose inner end is formed with a slot 26 to receive the pin 27 carried by one arm of the lever 28 pivoted on one of the arms 10 at 29. The other arm of this lever carries a pin 30 on which is mounted a link 31 whose other end is mounted on a pin 32 carried by the spider 22.

By swinging the lever 24 from the position shown in Fig. 1 toward that shown in Fig. 5, the dial 21 is turned clockwise (viewed from the front), the movement of the dial being limited by the set screws 34 carried by small lugs 35 on the spider, which screws engage the adjacent arms 10 as shown in Figs. 1 and 5.

In order to prevent the movable dial from making any undesired movements, springs 38 are attached to the spider 22 and slide on the circular ring 11 connecting the arms 10.

Under normal weighing, the parts are as shown in Fig. 1, with the zeros of the dials under the wire 40 on the indicator. I prefer to place the word "Tare" on the dial 21 just outside of the zero mark thereon. When a container is placed on the scale, the opening in the indicator permits the graduations on both dials to be read simultaneously and the indicator wire 40 will designate on the dial 20 the weight of the container or the tare. The lever 24 is then swung to turn the dial 21 until the zero thereon is under the wire 40 and when the filled container is now placed on the scale, the indicator 15 will turn to indicate the gross weight on the dial 20, the net weight on the dial 21 and the dials 20 and 21 together will indicate the tare.

Where the tare is already known, the dial 21 may be turned accordingly by the lever 24 and the net and gross weights immediately read.

The details of this construction and the proportions of the parts may all be changed by those skilled in the art without departing from the spirit of my invention as set forth in the following claims.

I claim:—

1. In an indicating mechanism for scales, a shaft which turns according to the load on the scale, a pointer on the shaft, a stationary dial ring having graduations to indicate gross weight, a rotatable dial disc within the dial ring having graduations to indicate net weights, a case for said mechanism, and manually operable means embodying a lever projecting out of the case for turning said dial disc.

2. In an indicating mechanism for scales, a shaft which turns according to the load on the scale, a pointer on the shaft, a stationary dial ring having graduations to indicate gross weight, a rotatable dial disc within the dial ring having graduations to indicate net weights, a case for said mechanism, manually operable means embodying a lever projecting out of the case for turning said scale dial, and means to limit the movement of said dial disc.

3. In an indicating mechanism for scales, a case for the indicating mechanism, a shaft which turns according to the load on the scale, a pointer on the shaft, an adjustable bearing for the shaft, means mounted in the case to support the bearing, a stationary dial ring mounted in the case to indicate gross weights, a rotatable graduated dial within said ring to indicate net weights, a spider rotatable on said bearing and to which said dial disc is attached, and manually operable lever mechanism to turn said dial disc, one of said lever members projecting from said case, said indicator being formed with an opening through which the graduations on both dials may be read simultaneously.

LOUIS JAENICHEN.